(12) United States Patent
Laflamme et al.

(10) Patent No.: US 9,815,343 B1
(45) Date of Patent: Nov. 14, 2017

(54) TIRE SENSING METHOD FOR ENHANCED SAFETY AND CONTROLLABILITY OF VEHICLES

(71) Applicant: Iowa State University Research Foundation, Inc., Ames, IA (US)

(72) Inventors: Simon Laflamme, Ames, IA (US); Randall L. Geiger, Ames, IA (US)

(73) Assignee: Iowa State University Research Foundation, Inc., Ames, IA (US)

( * ) Notice: Subject to any disclaimer, the term of this patent is extended or adjusted under 35 U.S.C. 154(b) by 48 days.

(21) Appl. No.: 14/733,640

(22) Filed: Jun. 8, 2015

Related U.S. Application Data

(60) Provisional application No. 62/008,531, filed on Jun. 6, 2014.

(51) Int. Cl.
*B60C 23/06* (2006.01)
*B60C 5/00* (2006.01)

(52) U.S. Cl.
CPC .............. *B60C 23/064* (2013.01); *B60C 5/00* (2013.01)

(58) Field of Classification Search
CPC ...... G01M 17/02; B60C 23/06; B60C 23/064; B60C 23/00; B60C 23/02
USPC ................................................ 73/146, 146.2
See application file for complete search history.

(56) References Cited

U.S. PATENT DOCUMENTS

| | | | | |
|---|---|---|---|---|
| 6,339,956 B1 * | 1/2002 | Huinink | ............... | B60C 15/06 152/152.1 |
| 6,339,962 B1 * | 1/2002 | Scheuter | ............. | G01G 3/1402 73/796 |
| 6,539,295 B1 * | 3/2003 | Katzen | ................. | G01M 17/02 701/33.6 |
| 6,637,276 B2 | 10/2003 | Adderton et al. | | |
| 6,951,143 B1 * | 10/2005 | Adderton | ................ | G01L 5/161 73/862.044 |
| 7,100,432 B2 * | 9/2006 | Forster | ................ | B60C 23/0433 73/146 |
| 7,146,853 B2 * | 12/2006 | Fischer | ............... | B60C 23/0416 73/146 |
| 7,249,498 B2 | 7/2007 | Miyoshi et al. | | |
| 7,506,539 B2 | 3/2009 | Miyoshi et al. | | |
| 7,513,144 B2 | 4/2009 | Miyoshi | | |
| 7,668,669 B2 | 2/2010 | Miyoshi | | |

(Continued)

OTHER PUBLICATIONS

Matsuzaki, Ryosuke et al., "Wireless strain monitoring of tires using electrical capacitance changes with an oscillating circuit" Sensors and Actuators A 119 (2005) pp. 323-331.

*Primary Examiner* — Lisa Caputo
*Assistant Examiner* — Philip Cotey
(74) *Attorney, Agent, or Firm* — McKee, Voorhees & Sease, PLC

(57) ABSTRACT

A method for tire sensing includes providing a tire comprising (a) a tire body having an outer wall for contact with a surface and opposite side walls, and an inside surface and (b) at least one flexible strain gauge positioned along the inside surface of the tire body, wherein the at least one flexible strain gauge is positioned to sense tire deflections or strain. The method further includes sensing tire data indicate of the tire deflections using the at least one flexible strain gauge and communicating the tire data to a data acquisition system, control system, or computer system. The flexible strain gauge(s) may be soft dielectric capacitive sensors, soft resistive sensors, or soft capacitive/resistive sensors.

22 Claims, 7 Drawing Sheets

(56) References Cited

U.S. PATENT DOCUMENTS

| | | | |
|---|---|---|---|
| 7,971,477 B2 | 7/2011 | Kubota | |
| 8,051,705 B2 * | 11/2011 | Kobayakawa | B60C 23/0411 |
| | | | 73/146 |
| 2002/0092364 A1 * | 7/2002 | Adderton | G01L 5/161 |
| | | | 73/862.41 |
| 2002/0121132 A1 * | 9/2002 | Breed | B60C 11/24 |
| | | | 73/146 |
| 2004/0103725 A1 * | 6/2004 | Tomka | G01M 5/0008 |
| | | | 73/779 |
| 2004/0148078 A1 * | 7/2004 | Nakano | B60C 23/00 |
| | | | 701/41 |
| 2005/0097949 A1 * | 5/2005 | Hillenmayer | B60C 23/0488 |
| | | | 73/146 |
| 2005/0103100 A1 * | 5/2005 | Miyoshi | G01L 5/164 |
| | | | 73/146 |
| 2005/0251306 A1 * | 11/2005 | Gowan | B60T 8/1703 |
| | | | 701/71 |
| 2007/0240502 A1 * | 10/2007 | Morinaga | B60C 19/00 |
| | | | 73/146 |
| 2008/0127753 A1 * | 6/2008 | Miyoshi | G01L 5/16 |
| | | | 73/862.627 |
| 2008/0245459 A1 * | 10/2008 | Miyoshi | G01L 5/16 |
| | | | 152/450 |
| 2008/0300801 A1 * | 12/2008 | Miyoshi | G01L 5/164 |
| | | | 702/42 |
| 2009/0049903 A1 * | 2/2009 | Murakami | B60C 23/064 |
| | | | 73/146 |
| 2010/0043541 A1 * | 2/2010 | Kobayakawa | B60C 23/0411 |
| | | | 73/146 |
| 2011/0191036 A1 * | 8/2011 | Wang | G01L 5/161 |
| | | | 702/42 |
| 2011/0232392 A1 * | 9/2011 | Suess | G01L 1/10 |
| | | | 73/779 |
| 2011/0241704 A1 | 10/2011 | Laflamme et al. | |
| 2013/0207796 A1 * | 8/2013 | Stewart | B60C 23/0416 |
| | | | 340/438 |

* cited by examiner

TIRE SENSING METHOD FOR ENHANCED SAFETY AND CONTROLLABILITY OF VEHICLES

CROSS REFERENCE TO RELATED APPLICATIONS

This application claims priority under 35 U.S.C. §119 to provisional application U.S. Ser. No. 62/008,531, filed Jun. 6, 2014, which is herein incorporated by reference in its entirety.

FIELD OF THE INVENTION

The present invention relates to tires. More particularly, but not exclusively, the present invention relates to a tire and related methods for sensing changes in tire shape and tire stress under various static and time-varying use of a tire.

BACKGROUND

Various improvements have been made to tires over the years. However, proper operation of tires remains critically important to vehicle safety. Moreover, improved knowledge and understanding of tire condition could provide improved control of a vehicle. For example, being able to measure tire deformations in real-time would enable monitoring of the slip ratio and coefficient of friction between the tire and the road surface, provide knowledge about the road surface (e.g., gravel, concrete) and conditions (e.g., iced, wet, dry). This would directly improve vehicle controllability, fuel efficiency, and safety by improving stability via additional feedback to the controller and detecting tire separation and burst at an early stage. Moreover, improved knowledge of static and dynamic tire strain provides additional information that can be used to improve overall vehicular system capabilities and performance. Thus, what are needed are methods and systems for monitoring strain over a tire surface due to the large deformations and size of the monitored surface.

SUMMARY

Therefore, it is a primary object, feature, or advantage to improve over the state of the art.

It is a further object, feature, or advantage to monitor changes in tire shape and tire strain in real-time.

It is a still further object, feature, or advantage to enhance the safety and/or controllability of vehicles.

It is another object, feature, or advantage to provide feedback regarding slippage, force, contact, pressure, or other tire parameters to a vehicle control system.

It is yet another object, feature, or advantage to provide for real-time monitoring of tire conditions.

It is a further object, feature, or advantage to provide for diagnosing tire degradation and alerting a driver.

It is a still further object, feature, or advantage to use tire monitoring to improve vehicle stability, fuel efficiency, and driving comfort.

It is a still further object, feature, or advantage to provide for improved controllability, functionality, and operability of farming and construction vehicles.

It is a still further object, feature, or advantage to provide for improved controllability, functionality, and operability of farming and cars, truck, and other conventional vehicles.

It is another object, feature, or advantage to provide for detecting terrain based on tire deflection and using such information by a controller to re-balance the vehicle and provide enhanced fuel efficiency and stability.

One or more of these and/or other objects, features, or advantages will become apparent from the specification and claims that follow. No single embodiment need exhibit all of these objects, features, or advantages as it is contemplated that different embodiments may have different objects, features, or advantages.

According to one aspect an apparatus is provided which includes a tire body having an outer wall for contact with a surface and opposite side walls, and an inside surface and at least one flexible strain gauge positioned along the inside surface of the tire body, wherein at least one flexible strain gauge is positioned to sense tire deflections and strain and produce sensor data. The flexible strain gauges here termed Flexible Electronic Sensors (FES) may each be a soft capacitive sensor or a soft resistive sensor or a combination of soft capacitive and resistive sensors. The combination sensors could be separate devices or one or both plates of the capacitive sensor could also serve as resistive sensors.

According to another aspect, a method for tire sensing includes providing a tire comprising (a) a tire body having an outer wall for contact with a surface and opposite side walls, and an inside surface and (b) at least one flexible strain gauge positioned along the inside surface of the tire body, wherein the at least one flexible strain gauge is positioned to sense tire deflections and strain. The method may further include the steps of sensing tire data indicative of the tire deflections using the at least one flexible strain gauge and communicating the tire data to a control system.

According to another aspect, a system for smart tire sensing includes (a) a tire body having an outer wall for contact with a surface and opposite side walls, and an inside surface (b) at least one flexible strain gauge positioned externally to the tire body, wherein the at least one flexible strain gauge is positioned to sense tire contact, deflections or strain, and (c) a communication system for transmitting/communicating tire sensory data to a data acquisition system, control system, or computer system.

DETAILED DESCRIPTION

Figure 1A:
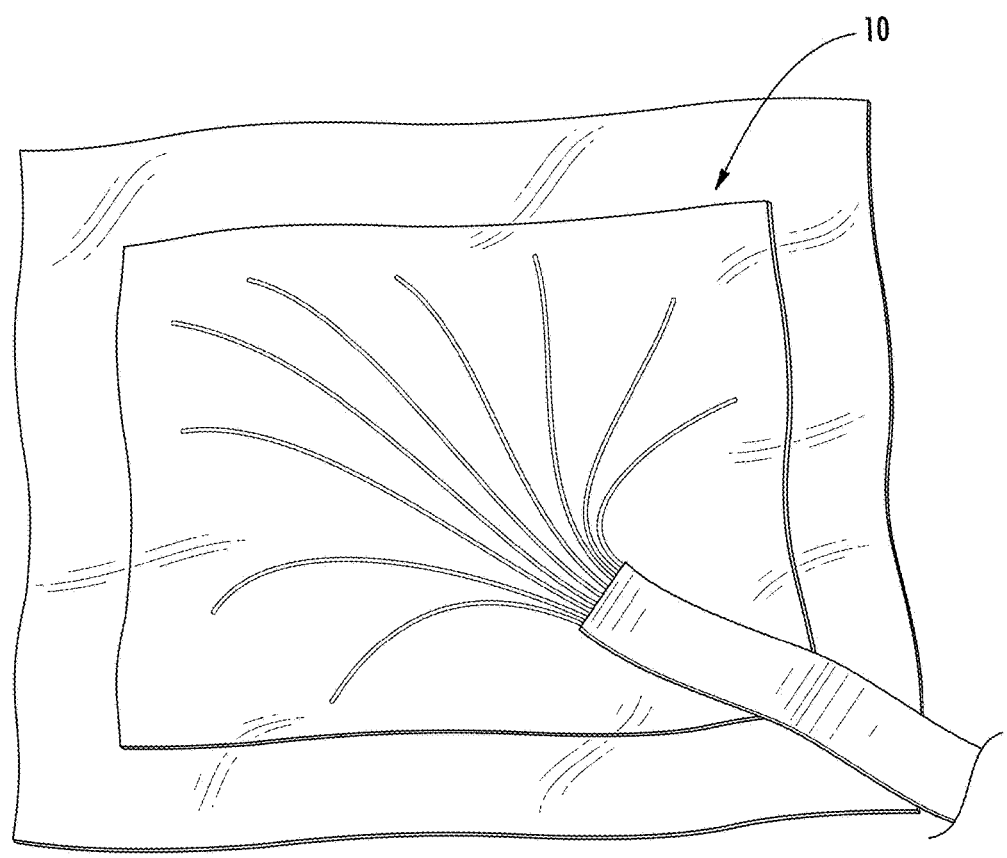
FIG. 1A illustrates an example of a soft elastomeric capacitor for monitoring of surface strain, one example of an FES.

FIG. 1A illustrates an example of a soft elastomeric capacitor 10 for monitoring of surface strain. The soft elastomeric capacitor 10 is one example of a FES.

The FES of the present invention constitutes a large-scale flexible strain gauge that can monitor over large or long surfaces. The sensors are precise and mechanically robust. With some formulations, the FES is linear beyond 20% strain levels, and a fatigue test showed that with some formulations the material remains elastic after 2 million cycles of 10% strain at 40 Hz. Other formulations of the FES may have larger or smaller linearity ranges and larger or smaller elastic cycles. The FES strain gauges used may be those described in US2011/0241704 A1, herein incorporated by reference in its entirety. Thus, the flexible strain gauges 10 may comprise a soft dielectric capacitive sensor assembly, a soft resistive assembly, or a soft joint capacitive/resistive assembly.

Figure 1B:
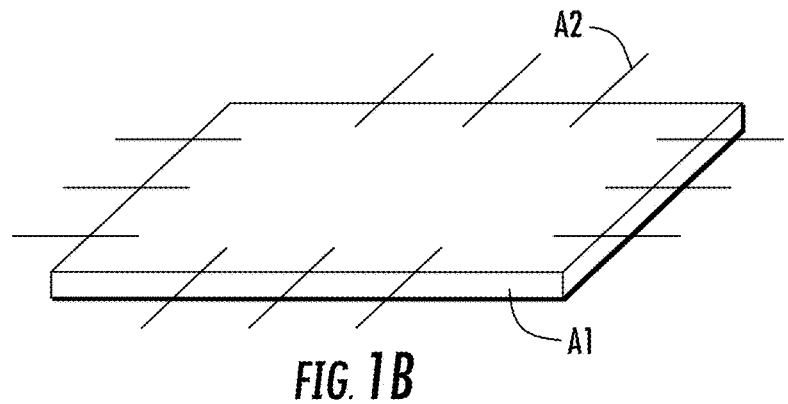
FIG. 1B to FIG. 1D illustrate other examples of sensor topologies constituting an FES.
Figure 1C:
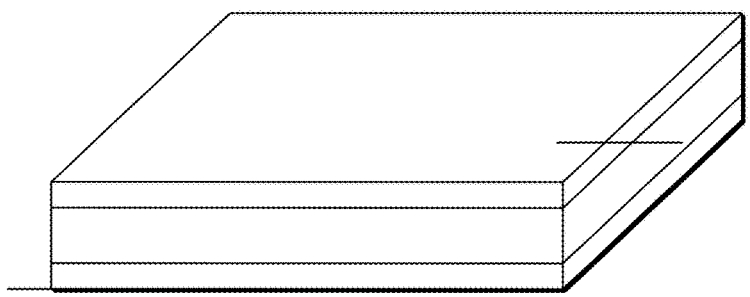
Figure 1D:
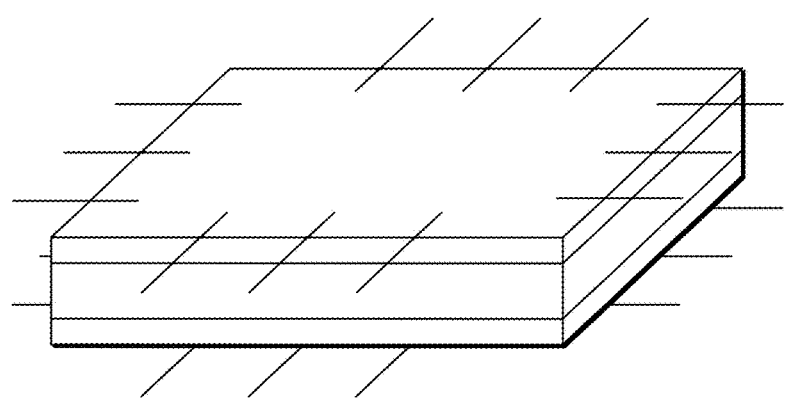

FIG. 1B through FIG. 1D illustrate possible sensor topologies constituting an FES. FIG. 1B is an example of a soft elastomeric resistor which may include a layer of soft resistive material A1 and electrodes A2. FIG. 1C is an example of a soft elastomeric capacitor, which may include a layer of soft dielectric material 12 with large strain, low modulus of elasticity and high compliance such as a polymeric material. The layer of soft dielectric material 12 may be disposed between electrodes 14, 16 to form a capacitor. FIG. 1D is an example of a combined soft elastomeric capacitor and soft elastomeric resistor, in which the layers of electrodes 14, 16 are also used as a soft elastomeric resistor. Thus, tire deflections strain or deform the FES thereby producing a change in the resistance and/or capacitance. By appropriately configuring the electrodes on the soft elastomeric resistors, not only strain levels but direction of strain can be measured.

Figure 2A:
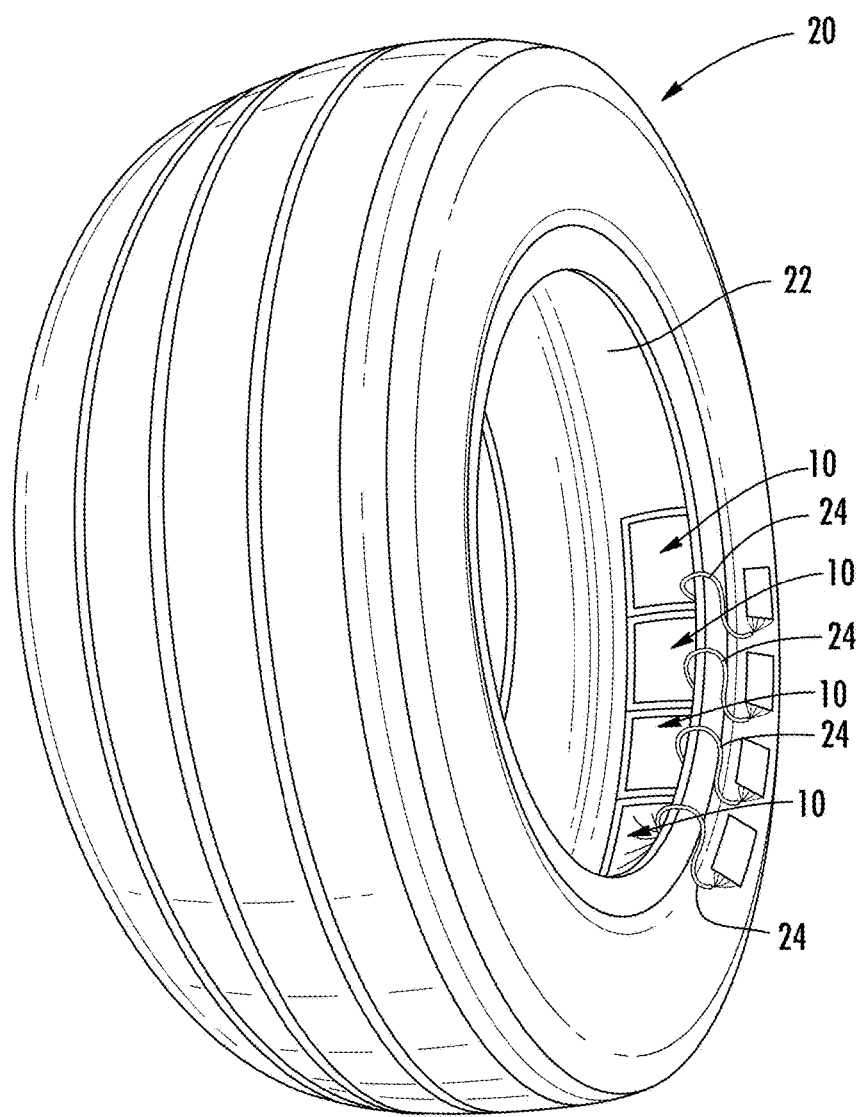
FIG. 2A illustrates a tire with a plurality of sensors deployed inside.
Figure 2B:
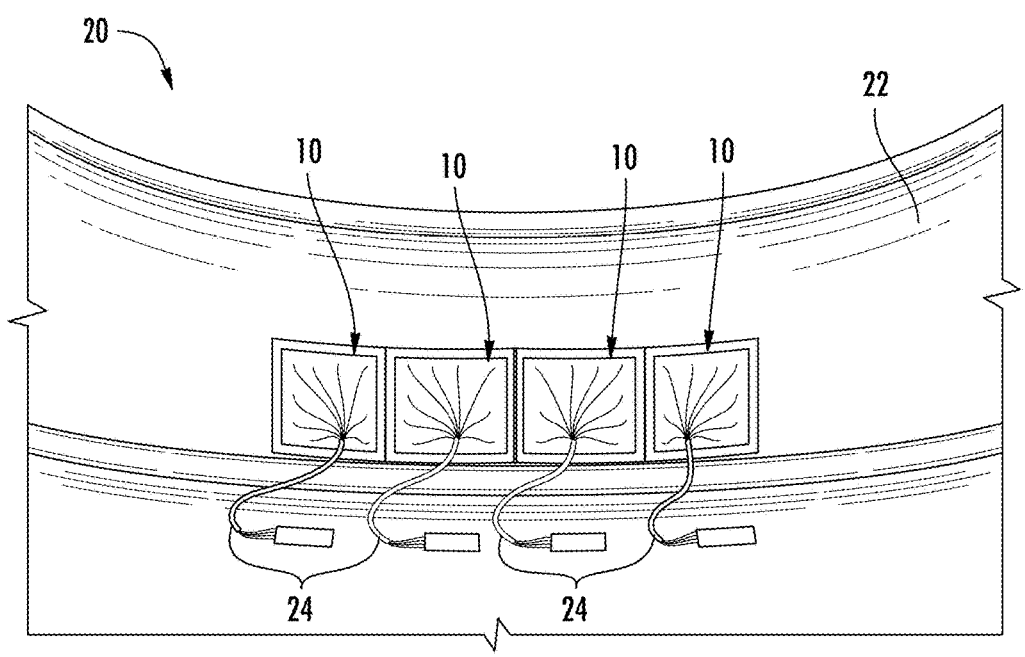
FIG. 2B illustrates another view of the tire of FIG. 2A.

FIGS. 2A and 2B show a tire 20 with a plurality of sensors 10 used for a proof-of-concept deployed over a limited length of the tire 20. In applications, more sensors 10 may be used to cover the entire tire inside-surface 22. Note that as shown, wires 24 are used to connect to the data acquisition system. In applications, any wired or wireless communication protocols could be used as may be appropriate in a particular environment.

Figure 3:
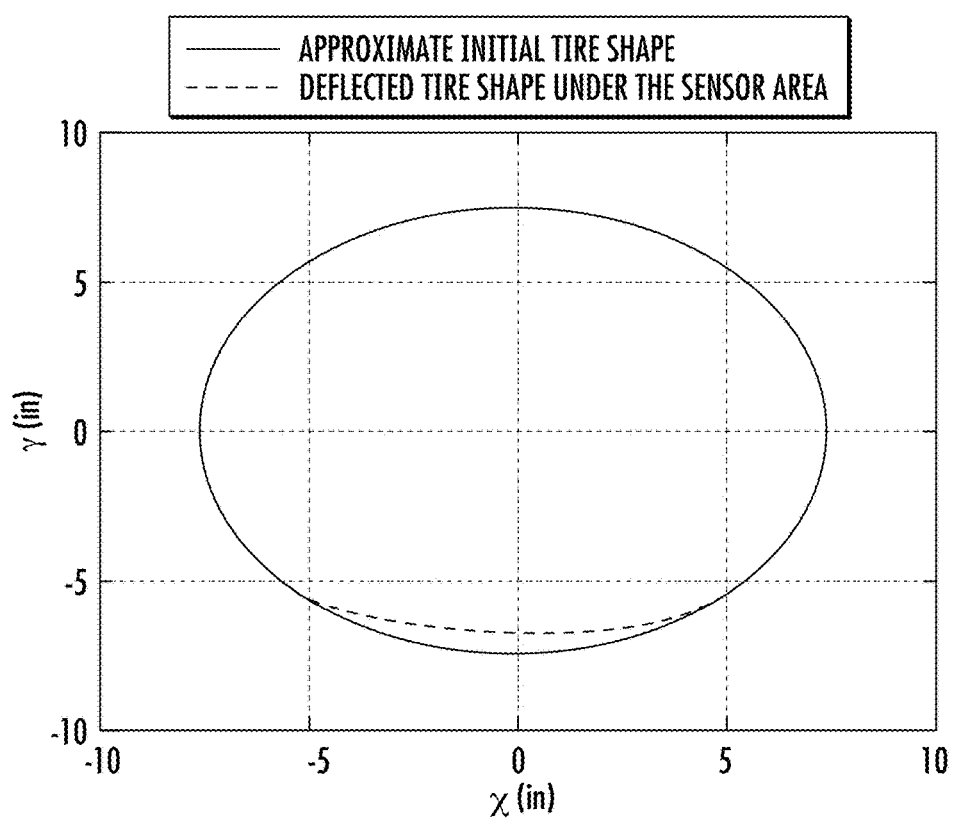
FIG. 3 illustrates a deflected tire under load.
Figure 4:
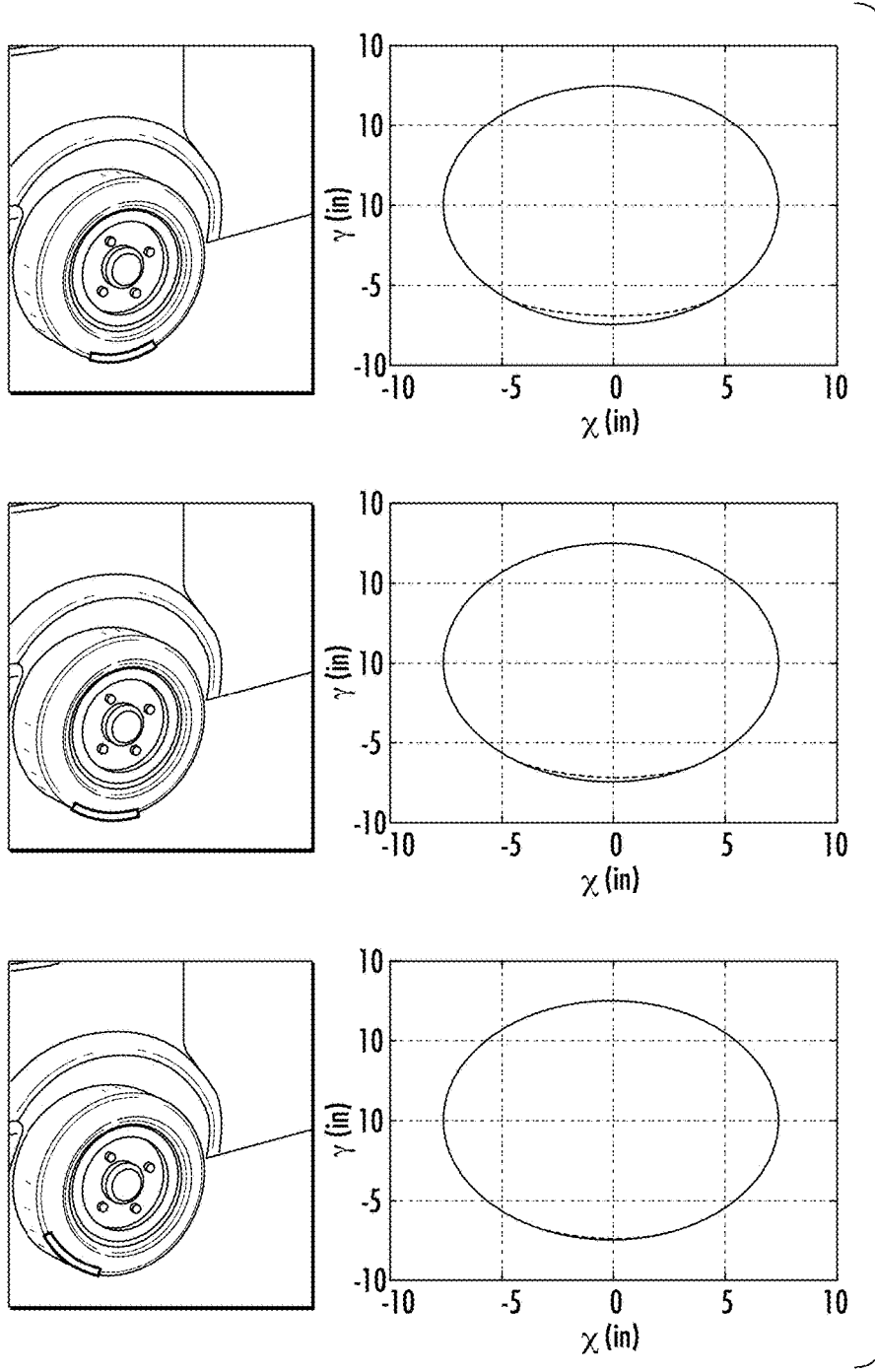
FIG. 4 further illustrates a tire with varying loads on the sensors.

As shown in FIGS. 2A-2B, four FESS 10 are installed onto the inside surface 22 of a tire 20. Sensors 10 are wired for convenience of the demonstration. The tire 20 has been mounted on a vehicle (not shown), and the tire rotated via a back-and-forth motion around the sensor line. FIG. 3 shows the deflected shape of the tire in FIGS. 1A-1B from an applied load downwards in the y axis (axis y is vertical, axis x is horizontal). The stress can be obtained at a large number of points on the tire through the judicious choice of the number and location of the sensors. From this stress information, useful information about both the vehicle and the tire such as tire shape, vehicle acceleration, vehicle velocity, normal force on the tire, lateral force on the tire, longitudinal force on the tire, coefficients of friction, and other states can be obtained from the stress profile. This is different from conventional pressure gauges, which may only measure the tire pressure. FIG. 4 further illustrates preliminary results, where the deformation of the tire around the sensor line (white thick line on the pictures) is plotted (the sensor line is horizontal in the plot and does not follows the tire rotation). The sensor enables monitoring of surface strain in real time.

An array of FESs may be positioned onto the interior surface of a tire to monitor deformation in real time, creating a Smart Tire. The sensor is lightweight and small electronics may be used for transmitting data wirelessly from each FES, alternatively, an RFID communication protocol may be used to enable implementation within a rotating piece of equipment. Other types of wired or wireless communications may be used. For example, an RF transmitter may be placed in the tire, on the tire, or on the wheel. In addition, the sensor itself may have the capability to harvest energy by incorporating piezoelectric nanoparticles or other active materials within the polymer matrix to power the RF transmitter or other electronics.

Figure 5:
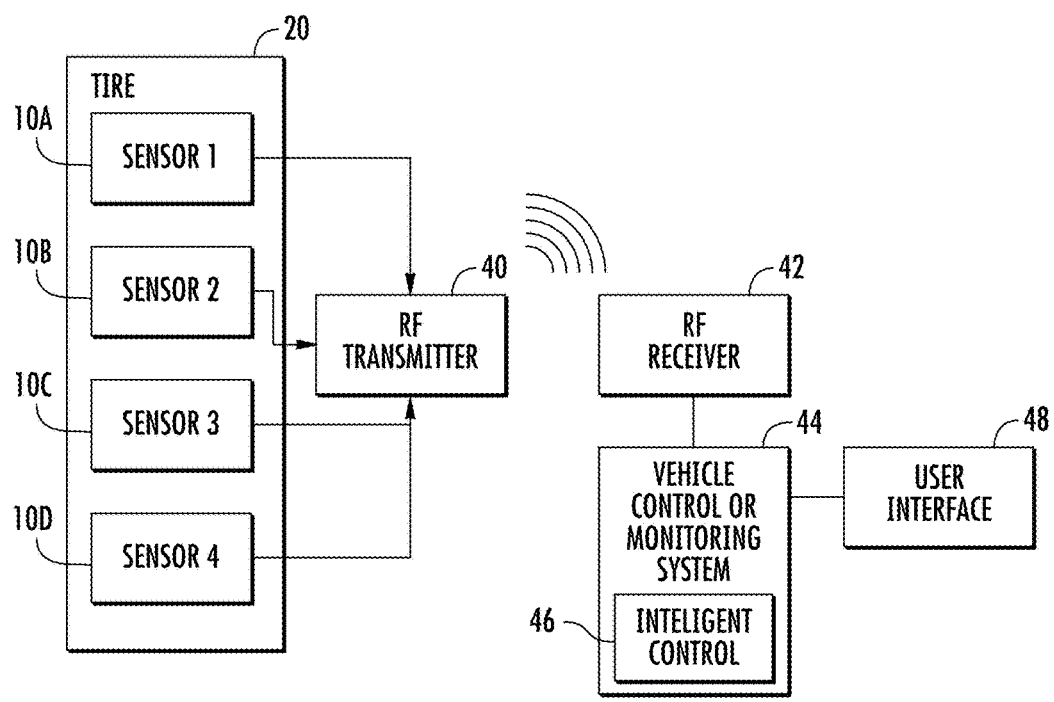
FIG. 5 is a block diagram illustrates one example of a system.

FIG. 5 is a block diagram illustrating one system where a tire 20 includes a plurality of sensors 10A, 10B, 10C, 10D electrically connected to a communications interface which may be a wireless communications interface and include an RF transmitter 40 which may be in wireless communication with an RF receiver 42 which is operatively connected to an instrumentation interface or vehicle control or monitoring system 44. The vehicle control or monitoring system 44 has an intelligent control 46 and includes or is operatively connected to a user interface 48 which may include one or more user controls. Although only a single tire is shown, more than one, and preferably all tires associated with a vehicle may be instrumented with sensors.

The instrumented tire allows for tire deflection to be monitored in real-time. The present invention may be used in various for ways. For example, this may include providing enhanced vehicle safety and computer-aided driving. The computer associated with the vehicle control or monitoring system may receive feedback on the current states of the vehicle, for instance if some tires are slipping, not in contact, over pressurized, etc., and adapt the control system accordingly to improve the vehicle stability, fuel efficiency, and driving comfort. Such a system may be especially desirable in high-end vehicles.

The present invention may be used for real-time monitoring of tire conditions. The instrumented tire may allow for diagnosing tire degradation and warn the driver. Burst of truck tires on highways is a large safety concern. Thus, the described system may be particularly desirable for truck tires or other fleet vehicles.

The present invention may be used to provide improved controllability of farming and construction vehicles. Monitoring of the tire deflections allows for detection of terrains (e.g. gravel, mud, etc.), which can be used by the controller to re-balance the vehicles and enhanced fuel efficiency and stability. Thus, the instrumented tire may be particularly well-suited for utility vehicles, agricultural vehicles, construction vehicles and related vehicles. However, such functionality may also be beneficial to any number of different types of vehicles which have tires, including any number of cars, trucks or other conventional vehicles, road vehicles, off-road vehicles, luxury vehicles, and aircraft.

Various apparatuses, methods, and systems have been disclosed. It is to be understood that the present invention is not to be limited to the specific embodiments described herein as others are contemplated. For example, variations in the number of sensors, the type of sensors, and the placement of sensors are contemplated. External placements for experimental verification and validation of tires is also contemplated. Individual or combined applications on the outside surface, inside surface, and in the body of the tire are also contemplated. Variations in the number and types of different analyses performed with sensor data are also contemplated. Variations in the way in which information is collected and communicated to a control system are also contemplated.

What is claimed:

1. An apparatus for sensing or monitoring one or more tire parameters related to tire deformation comprising;
    a deformable tire body having an outer wall for contact with a surface, opposite side walls, and an inside;
    at least one flexible sensing assembly positioned across an area on the inside of the tire body, wherein the at least one flexible sensing assembly is positioned to sense tire deformation at the area and produce sensor data; the flexible sensing assembly comprising a soft dielectric capacitor, soft resistor, or combined soft capacitor and resistor sensing assembly structure comprising:

(1) a bonding layer disposed to bond the sensing assembly structure to the area on the inside of the tire body without affecting compliancy of the sensing assembly with deformation of the tire at the area;

(2) a compliant dielectric layer comprising a soft, elastic dielectric material having a first surface and a second surface and which is compliant with deformation of the tire at the area, and a thickness defined between the first surface and the second surface, a deformation of the soft dielectric material producing a change in capacitance and/or resistance, and (3) electrodes disposed in opposition on the first and second surfaces of the soft dielectric material, wherein the electrodes are configured to operate in conjunction with the compliancy of the soft dielectric material;

a communications interface operatively connected with the flexible sensing assembly to communicate signals representative of capacitance and/or resistance from which the parameters related to tire deformation can be derived.

2. The apparatus of claim 1 wherein the at least one flexible sensing assembly comprises a Flexible Electronic Sensor.

3. The apparatus of claim 2 wherein the Flexible Electronic Sensor comprises a soft dielectric capacitor, a soft resistor, or a soft resistor/capacitor.

4. The apparatus of claim 1 further comprising an instrumentation interface circuit operatively connected to at least one flexible sensing assembly.

5. The apparatus of claim 1 further comprising a control circuit operatively connected to the at least one flexible sensing assembly.

6. A vehicle comprising at least one of the apparatus of claim 1.

7. The apparatus of claim 1 wherein the communications interface is a wireless interface.

8. A method for tire deformation sensing comprising:

(a) providing a deformable tire body having an outer wall for contact with a surface;

(b) bonding to the area of the tire body at least one flexible sensing assembly without affecting compliancy of the sensing assembly with deformation of the tire at the area, wherein the at least one flexible sensing assembly is positioned to sense tire deformation at the area by a soft, elastic dielectric capacitor, soft resistor, or combined soft capacitor and resistor which is compliant with deformation of the tire at the area, and at least a pair of electrodes configured to operate in conjunction with the compliancy of the soft dielectric capacitor, soft resistor, or combined soft capacitor and resistor;

(c) sensing a change in capacitance and/or resistance of the flexible sensing assembly at the area of the tire;

(d) converting the sensed change in capacitance and/or resistance into tire sensory data and transmitting/communicating the tire sensory data to a data acquisition system, control system, or computer system for correlating the sensory data with parameters related to tire deformation.

9. The method of claim 8 further comprising performing an analysis of the tire sensory data by the data acquisition system, control system, or computer system.

10. The method of claim 9 further comprising generating feedback to an operator of a vehicle associated with the tire based on the analysis.

11. The method of claim 9 wherein the analysis comprises a tire degradation analysis based on correlating the tire sensory data to tire degradation.

12. The method of claim 9 wherein the analysis comprises a slippage analysis based on correlating the tire sensory data to a tire slippage.

13. The method of claim 9 wherein the analysis comprises a tire contact analysis based on correlating the tire sensory data to a tire contact.

14. The method of claim 9 wherein the analysis comprises a tire force analysis based on correlating the tire sensory data to tire force.

15. The method of claim 9 wherein the analysis comprises a pressure analysis based on correlating the tire sensory data to tire pressure.

16. The method of claim 9 wherein the analysis comprises a terrain analysis based on correlating the tire sensory data to terrain.

17. The method of claim 9 further comprising adjusting vehicle control parameters based on the analysis.

18. The method of claim 9 wherein the tire data is indicative of a puncture of the tire.

19. The method of claim 9 wherein the tire sensory data is indicative of a low pressure condition.

20. The method of claim 9 wherein the communicating the tire sensory data to the control system is performed using a wireless transceiver.

21. The method of claim 8 wherein each of the at least one flexible sensing assembly comprise a soft dielectric capacitive sensor, a soft resistive sensor, or a soft resistive/capacitive sensor.

22. A system for smart tire sensing comprising:

(a) a deformable tire body having an outer wall for contact with a surface, opposite side walls, and an inside;

(b) an array of flexible sensing assemblies positioned across one or more areas on the tire body to sense tire deformation at the areas, each said flexible sensing assembly comprising a soft dielectric capacitor, soft resistor, or soft combined capacitor and resistor sensing assembly structure comprising;

(1) a bonding layer disposed to bond the sensing assembly structure to the tire body without affecting compliancy of the sensing assembly with deformation of the tire at the area;

(2) a compliant dielectric layer comprising a soft, elastic dielectric material having a first surface and a second surface and which is compliant with deformation of the tire at the area, (3) a thickness defined between the first surface and the second surface, a deformation of the soft dielectric material producing a change in capacitance or resistance, and (4) electrodes disposed in opposition on the first and second surfaces of the soft dielectric material, wherein the electrodes are configured to operate in conjunction with the compliancy of the soft dielectric material; and (c) a communication system for converting the change in capacitance or resistance to tire sensory data and transmitting/communicating the tire sensory data to a data acquisition system, control system, or computer system for correlation to one or more parameters related to tire deformation.

* * * * *